(12) United States Patent
Shiono et al.

(10) Patent No.: US 7,313,080 B2
(45) Date of Patent: Dec. 25, 2007

(54) INFORMATION RECORDING MEDIUM AND ITS PRODUCTION METHOD, AND OPTICAL INFORMATION RECORDING REPRODUCING APPARATUS

(75) Inventors: Teruhiro Shiono, Osaka (JP); Hiroaki Yamamoto, Kawabe-gun (JP); Seiji Nishino, Osaka (JP); Tsuneo Mitsuyu, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 667 days.

(21) Appl. No.: 10/510,400

(22) PCT Filed: Apr. 7, 2003

(86) PCT No.: PCT/JP03/04378

§ 371 (c)(1),
(2), (4) Date: Oct. 5, 2004

(87) PCT Pub. No.: WO03/085657

PCT Pub. Date: Oct. 16, 2003

(65) Prior Publication Data

US 2005/0157629 A1    Jul. 21, 2005

(30) Foreign Application Priority Data

Apr. 8, 2002    (JP)    ............................. 2002-104829

(51) Int. Cl.
*G11B 7/24*    (2006.01)
(52) U.S. Cl. .................................................. 369/275.1
(58) Field of Classification Search ............. 369/275.1, 369/275.2, 94, 288, 286, 284; 430/290
See application file for complete search history.

(56) References Cited

U.S. PATENT DOCUMENTS

| | | | | |
|---|---|---|---|---|
| 5,080,947 A | * | 1/1992 | Yamada et al. | ............ 428/64.4 |
| 5,559,784 A | | 9/1996 | Ota | |
| 5,614,938 A | * | 3/1997 | Sugiyama et al. | .......... 347/247 |
| 5,694,249 A | | 12/1997 | Misawa | |
| 5,698,344 A | * | 12/1997 | Bai et al. | ....................... 430/1 |

FOREIGN PATENT DOCUMENTS

| | | |
|---|---|---|
| JP | 62-28941 | 2/1987 |
| JP | 4-62090 | 2/1992 |

(Continued)

OTHER PUBLICATIONS

Y. Kawata et al., "Three-dimensional optical memory using an organic multilayered medium", in Proceedings for Optics Japan 2000, pp. 95-96, 2000.

*Primary Examiner*—Hoa T. Nguyen
*Assistant Examiner*—Henok G. Heyi
(74) *Attorney, Agent, or Firm*—Hamre, Schumann, Mueller & Larson, P.C.

(57) ABSTRACT

An information recording medium has a recording portion where three-dimensional information can be recorded. The recording portion includes at least one particle-containing layer (recording layer or a recording auxiliary layer) containing particles absorbing at least a part of light having a predetermined wavelength and substantially transparent to a recording light and a reproducing light having a wavelength longer than the predetermined wavelength and a particle holding material substantially transparent to the recording and reproducing lights. The mean particle size of the particles is preferably shorter than the wavelengths of the recording and reproducing lights.

33 Claims, 8 Drawing Sheets

FOREIGN PATENT DOCUMENTS

| | | |
|---|---|---|
| JP | 57-94944 | 2/1992 |
| JP | 8-85259 | 4/1996 |
| JP | 11-232706 | 8/1999 |
| JP | 2000-36133 | 2/2000 |

* cited by examiner

INFORMATION RECORDING MEDIUM AND ITS PRODUCTION METHOD, AND OPTICAL INFORMATION RECORDING REPRODUCING APPARATUS

TECHNICAL FIELD

The present invention relates to an information recording medium capable of three-dimensionally recording information and a method for producing the same, and an optical information recording/reproducing apparatus, and more particularly to an information recording medium capable of recording with high sensitivity and at high speed and a method for producing the same, and an optical information recording/reproducing apparatus.

BACKGROUND ART

One of the conventional information recording medium capable of three-dimensionally recording information is shown in FIG. 8 (Yoshimasa Kawata et al.: Three-dimensional optical memory using an organic multilayered recording medium; Optics Japan 2000, Proceedings, p. 95-96, 7pB12 (2000)). In this information recording medium, on a glass substrate 104, recording layers 101a to 101d made of urethane-urea copolymer material that is a photon-mode recording material, and intermediate layers 102a to 102c made of a PVA (polyvinyl alcohol) film and a PMMA (polymethyl methacrylate) film are laminated alternately.

Laser light 108 is focused (i.e., irradiation with convergent light 107) on a desired recording layer of the recording layers 101a to 101d of this information recording medium by an objective lens 106, whereby information can be recorded. The laser light 108 used herein is pulse laser light having a pulse width of about 100 femtoseconds and an extremely high peak power. By focusing such pulse laser light on the recording layers 101a to 101d, information is recorded on the recording layers 101a to 101d by using the two-photon absorption that is one of the non-linear absorption phenomena. Specifically, in a portion where a power density of the convergent light 107 is high (in a light-focusing point) in a region that is irradiated with the convergent light 107 in the recording layers 101a to 101d, the two-photon absorption occurs. In this state a phenomenon that looks as if the portion were irradiated with light with a half wavelength of the wavelength of actually irradiated light occurs, and an information bit 105 is written. Furthermore, on the information bit 105, low power light is focused, and light reflected therefrom is detected by a photodetector (not shown) via the objective lens 106, whereby signals can be reproduced. In this information recording medium, since a plurality of recording layers are laminated in the direction of an optical axis of the objective lens (z direction), information can be recorded three-dimensionally and the recording capacity is increased.

However, there has been a problem in the above-mentioned conventional information recording medium that the recording sensitivity of the recording layer was not good. Accordingly, in the case of a recording method in which one information bit is formed by one pulse, it is necessary to use a femtosecond laser having an extremely large peak power (about 100 kW) as a light source, and thus the structure of the light source becomes complicated. Furthermore, there has been another problem in that in the case where a light source with a smaller peak power is used, pulse irradiation at the same place is required to be repeated several times (for example, from several tens to several thousands times) (i.e., since a photon-mode recording material is used for a recording layer, accumulated recording of refractive index change is possible), whereby the speed of writing information is reduced.

DISCLOSURE OF THE INVENTION

The information recording medium of the present invention a recording portion capable of recording information three-dimensionally. The recording portion comprises at least one particle-containing layer comprising: particles that absorb at least a part of light with a predetermined wavelength; are substantially transparent to recording light and reproducing light with wavelengths longer than the predetermined wavelength; and have an absorption rate with respect to the light with the predetermined wavelength that is higher than the absorption rate with respect to the recording light and the reproducing light, and a particle-holding material that is substantially transparent to the recording light and the reproducing light.

The method for producing an information recording medium of the present invention includes forming a coating containing particles and a particle-holding material; and applying the coating so as to form a particle-containing layer.

The optical information recording/reproducing apparatus of the present invention includes a light source for emitting recording light; a light source for emitting reproducing light; an objective lens for focusing the light emitted from the light source on the information recording medium; and a photodetector for detecting light reflected by the information recording medium. By using the change in the optical constant of the recording portion of the information recording medium, an information bit is recorded on the recording portion three-dimensionally.

BEST MODE OF CARRYING OUT THE INVENTION

Figure 1A:
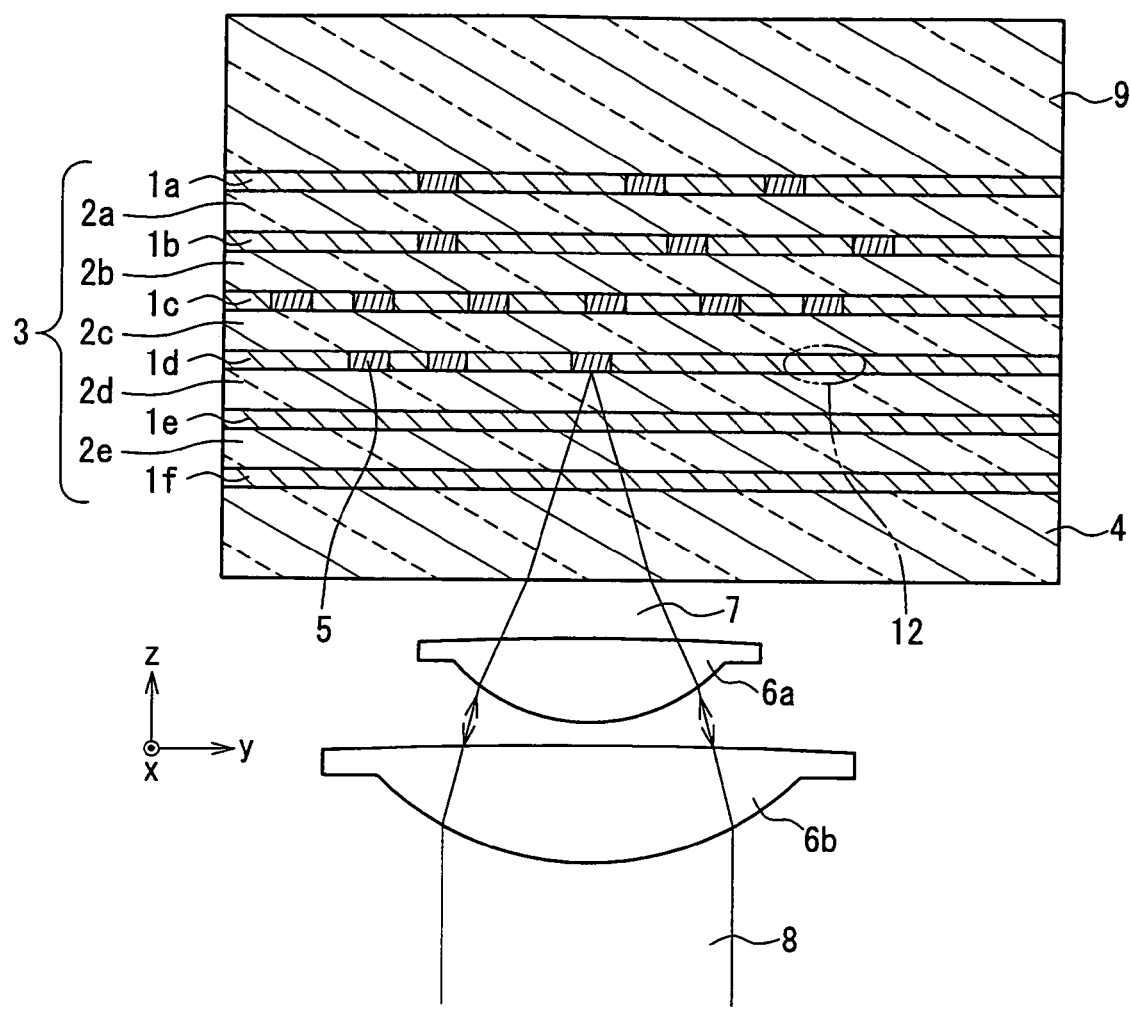
FIG. 1A is a view showing a cross-sectional configuration of an information recording medium and explaining a state in which information is recorded/reproduced according to Embodiment 1 of the present invention.

According to the information recording medium of the present invention, since the recording sensitivity is enhanced, it is possible to form one information bit by one pulse even if laser light having an extremely high peak power, which was required in the conventional example, is not used. Thus, the present invention can provide an information recording medium capable of recording information with high sensitivity at high speed. Note here that, throughout the description, the term "substantially transparent to recording light and reproducing light" means that almost all light components of the recording light and the reproducing light, except for scattered light components, are allowed to be transmitted without being absorbed. Specifically, for example, it is preferable that the transmittance with respect to one particle-containing layer is 95% or more, and more preferably 99% or more.

In the information recording medium of the present invention, it is preferable that the average particle-size of the particles is shorter than the wavelength of the recording light and the wavelength of the reproducing light. It is more preferable that the average particle-size of the particles is shorter than a quarter of the wavelength of the recording light and a quarter of the wavelength of the reproducing light. This is advantageous because, for example, in the case where a plurality of particle-containing layers are included in the recording portion, diffraction loss or scattering loss is suppressed so as to prevent the optical loss. Note here that in this case, since a part of particles is aggregated, particles (aggregate) whose apparent particle-size is larger than the wavelength of the recording light and the reproducing light may be present. Furthermore, even when the particles are aggregated, it is preferable that the apparent particle-size of the particles in an aggregated state is shorter than the wavelength of the recording light and the reproducing light.

In the information recording medium of the present invention, the particle-containing layer may be a recording layer, and the particle-holding material may have an optical constant that changes at a predetermined temperature. In this case, the recording portion includes a plurality of the recording layers and the plurality of the recording layers may be laminated via intermediate layers that are substantially transparent to the recording light and the reproducing light so as to form a multilayered structure.

Furthermore, in the information recording medium of the present invention, the recording portion further may include a recording layer and the particle-containing layer may be an auxiliary recording layer disposed in contact with the recording layer. In this case, a multilayered structure may be obtained by providing a plurality of laminate bodies composed of the recording layer and the auxiliary recording layer, and by providing an intermediate layers that are substantially transparent to the recording light and the reproducing light between the laminated bodies that are adjacent to each other.

Furthermore, in the information recording medium of the present invention, the particle-containing layer may be a recording layer, and the particle-holding material may have an optical constant that changes at a predetermined temperature, and an entire recording portion may be formed as one recording layer.

In the information recording medium of the present invention, a protective layer that is substantially transparent to the recording light and the reproducing light is provided at the side of the recording portion on which light is incident. It is advantageous because the recording portion can be protected from damage or dust, etc.

Furthermore, it is preferable that the protective layer or the intermediate layer is made of the same material as that of the particle-holding material. It is advantageous because an excellent interface between the particle-containing layer and the protective layer or the intermediate layer can be formed and also the material maintenance can be facilitated. Herein, the term "the same material" means the same kind of material. Thus, for example, resins each having different molecular weights due to the difference in the polymerization degree are regarded as the same material.

In the information recording medium of the present invention, it is preferable that the difference between the refractive index of the particle-holding material and the refractive index of the particles is 0.5 or less. This is advantageous because the scattering loss can be suppressed.

In the information recording medium of the present invention, it is preferable that the particles include an inorganic material or a semiconductor material. When the particles are formed of inorganic materials, the particle-containing layer can be stabilized. When the particles are formed of semiconductor materials, since the transmittance can be reduced rapidly in a certain range of wavelengths, the material is suitable for recording information by using a nonlinear absorption phenomenon. In such semiconductor materials, it is preferable that an energy gap is 2.5 eV or more and 8.3 eV or less. For example, it is preferable that the material include at least one selected from the group consisting of zinc oxide, tin oxide, zinc sulfide, titanium oxide, tungsten oxide, strontium titanate, silicon carbide, indium oxide and cadmium sulfide. This is advantageous because since the wavelength of the reproducing light can be set to be 500 nm or less, so that the reproducing resolution and recording density can be improved.

In the information recording medium using a plurality of particle-containing layers as a recording layer or an auxiliary recording layer, it is preferable that the particle-containing layer contains 1 wt. % or more and 95 wt. % or less of the particles. In this case, it is advantageous because by setting the content of the particles to be 1 wt. % or more, the recording sensitivity can be improved to the practical level, and by setting the content of particles to be 95 wt. % or less, the optical loss such as scattering of light, can be reduced to a practical level.

In the information recording medium in which the particle-containing layer is a recording layer and the whole recording portion is one recording layer, it is preferable that the particle-containing layer contains 0.3 wt. % or more and 10 wt. % or less of the particles. In this case, it is advantageous because by setting the content of particles to be 0.3 wt. % or more, the recording sensitivity can be improved to the practical level, and by setting the content of the particles to be 10 wt. % or less, the optical loss such as scattering of light can be reduced to a practical level.

Furthermore, in the information recording medium of the present invention, it is preferable that the particle-holding material is formed of a resin. It is advantageous because the particle-containing layer can be formed easily.

According to a method for producing the information recording medium of the present invention, the information recording medium of the present invention can be produced easily and at low cost.

In the method for producing the information recording medium of the present invention, it is preferable that the method further includes forming an intermediate layer by applying the coating containing materials substantially transparent to recording light and reproducing light, wherein in the step of forming the particle-containing layer, a material having an optical constant that changes at a predetermined temperature is used as the particle-holding material, and the step of forming the particle-containing layer and the step of forming the intermediate layer are repeated alternately a predetermined number of times. Thus, the particle-containing layer can be a recording layer, and a laminated bodies, in which a plurality of the recording layers are laminated, can be produced easily and at low cost.

In the method for producing the information recording medium of the present invention, the method further may include forming an intermediate layer by applying a coating containing a material that is substantially transparent to the recording light and the reproducing light; and forming a recording layer by applying the coating containing a material having an optical constant that changes at a predetermined temperature; wherein the step of forming the particle-containing layer, the step of forming the recording layer, and the step of forming the intermediate layer are repeated in a predetermined order and predetermined number of times periodically. According to this method, the information recording medium including a plurality of the recording layers and the auxiliary recording layers composed of the particle-containing layer can be produced easily and at low cost.

According to the optical information recording/reproducing apparatus of the present invention, information can be recorded on the information recording/reproducing medium of the present invention with high density and at high speed.

In the optical information recording/reproducing apparatus, it is preferable that the light source for emitting recording light is a pulse laser light source and a pulse width is in the range from 100 femtoseconds to 10 nanoseconds. It is more preferable that the pulse width is in the range from 1 picosecond to 100 picoseconds. This is advantageous because the recording sensitivity can further be enhanced.

In the optical information recording/reproducing apparatus of the present invention, it is preferable that the wavelength of the light source for emitting reproducing light is shorter than the wavelength of the light source for emitting recording light. This is advantageous because reproducing resolution and the recording density can be improved.

In the optical information recording/reproducing apparatus of the present invention, it is preferable that the information bit is recorded on the recording portion of the information recording medium by using a nonlinear absorption phenomenon. It is preferable that the nonlinear absorption phenomenon includes the two-photon absorption or the multiphoton absorption.

In the optical information recording/reproducing apparatus of the present invention, it is preferable that the information bit is recorded three-dimensionally on the recording portion of the information recording medium in the order in which the recording light does not pass through the information bit that has already been recorded on the recording portion. For example, it is preferable that the information bit is recorded sequentially in the order from the position distant from the objective lens to the position near the objective lens in the recording portion of the information recording medium. This is advantageous because by recording information bits in such an order, it is possible to reduce stray light such as scattered light, an unnecessary refractive light, and the like.

In the optical information recording/reproducing apparatus of the present invention, it is preferable that one light source is shared for the light source for emitting the recording light and the light source for emitting the reproducing light. This is advantageous because the number of light sources is one, and thus the configuration can be simplified.

Hereinafter, the embodiments of the present invention will be explained with reference to drawings.

Embodiment 1

Figure 1B:
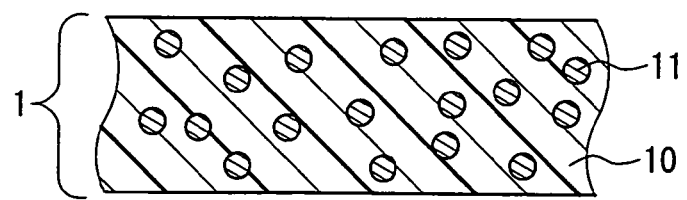
FIG. 1B is an enlarged view showing a recording layer of the information recording medium shown in FIG. 1A.
Figure 3:
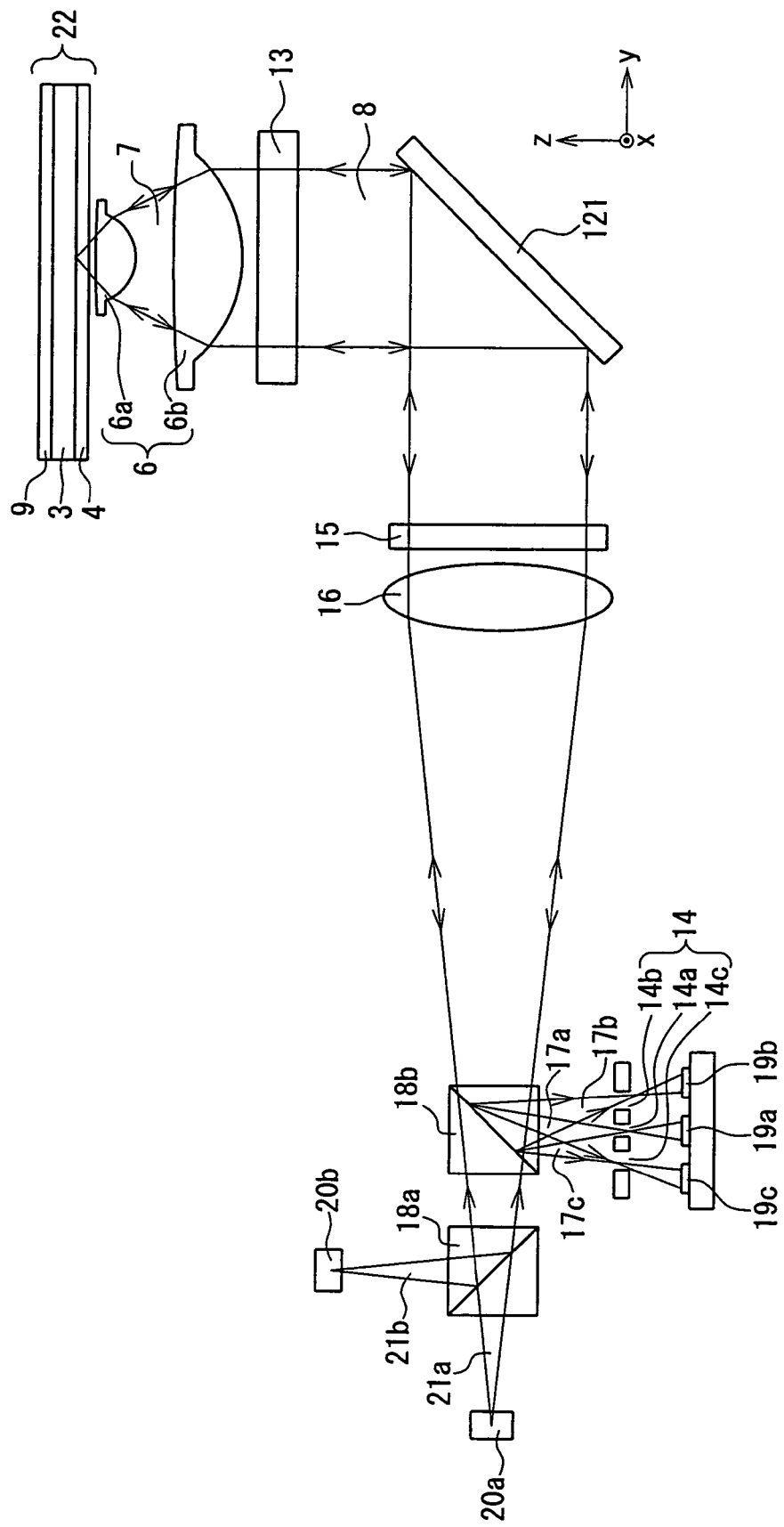
FIG. 3 is a schematic view showing an optical head of an optical information recording/reproducing apparatus according to Embodiment 1 of the present invention.
Figure 4:
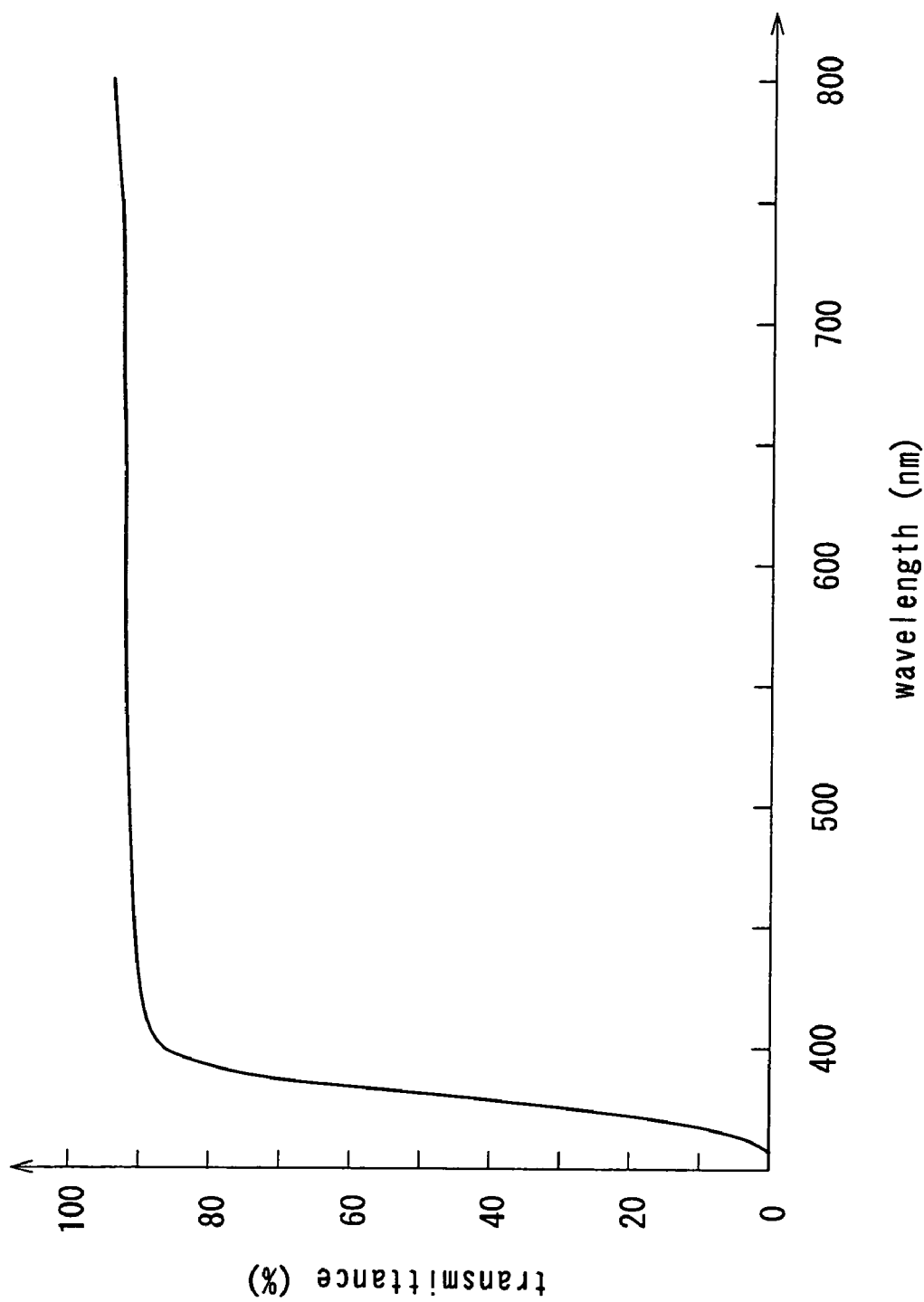
FIG. 4 is a graph showing a spectral transmittance curve of the recording layer of the information recording medium according to Embodiment 1 of the present invention.

An information recording medium and a method for producing the same, and an optical information recording/reproducing apparatus according to Embodiment 1 of the present invention will be explained with reference to drawings. FIGS. 1A and 1B show a cross-sectional configuration of the information recording medium and a state in which information is recorded and reproduced in the embodiment of the present invention. FIGS. 2A to 2D are cross-sectional views showing each step of producing an information recording medium according to this embodiment. FIG. 3 shows a schematic configuration of an optical head of an optical information recording/reproducing apparatus according to this embodiment. FIG. 4 shows a spectral transmittance curve of the recording layer of an example of the information recording medium according to this embodiment.

As shown in FIG. 1A, in the information recording medium of this embodiment, on a substrate 9, a recording portion 3 and a protective layer 4 are formed. In the recording portion 3, a plurality of recording layers (particle-containing layers) are laminated via intermediate layers. That is to say, in the recording portion 3, from the side of the substrate 9, a recording layer 1a, an intermediate layer 2a, a recording layer 1b, . . . , a recording layer 1e, an intermediate layer 2e, and a recording layer 1f are laminated sequentially. In the information recording medium of this embodiment, by including a plurality of recording layers in the recording portion 3, in addition to two-dimensional recording of information, three-dimensional recording capable of recording information by superimposing a plurality of layers in the thickness direction can be achieved. Note here that hereinafter, an arbitrary recording layer in the recording layers 1a to 1f will be referred to as a recording layer 1 and an arbitrary intermediate layer in the intermediate layers 2a to 2e will be referred to as an intermediate layer 2.

As shown in FIG. 1A, in the information recording medium of this embodiment, at the time of recording and reproducing information, light is incident on the side of the protective layer 4. At the time of recording information, laser light 8 is allowed to be focused on any one of the recording layers 1a to 1f by the objective lenses (lens pair 6a and 6b) (converging light beam 7), and an information bit 5 is formed. At the time of reproducing information, laser light 8 is allowed to be focused on a desired layer of the recording layers 1a to 1f by the objective lenses (lens pair 6a and 6b) (converging light beam 7) so as to reproduce information by light reflected by the information bit 5.

FIG. 1B is an enlarged view showing the recording layer 1 (a region 12 shown in FIG. 1A). As shown in FIG. 1B, the recording layer 1 is formed of a particle-holding material (binder) 10 in which particles 11 are dispersed.

The particles 11 are made of a material that is substantially transparent to recording light and reproducing light, and absorbs at least a part of light with a predetermined wavelength. This predetermined wavelength is shorter than the wavelength of the recording light (recording wavelength) and the wavelength of the reproducing light (reproducing wavelength), and the absorption rate of the particles 11 with respect to the light with a predetermined wavelength is higher than the absorption rate of the particles 11 with respect to the recording light and reproducing light. Furthermore, this predetermined wavelength is included in the predetermined range of wavelengths including the wavelength of the absorption spectrum of the particles 11 (in the range of the wavelength in which the transmittance of the particles is reduced) and the absorption rate of the particles 11 with respect to the light of this predetermined wavelength is preferably 5% or more and more preferably 20% or more per recording layer. Furthermore, it is preferable that the average particle-size of the particles 11 is smaller than the recording wavelength and the reproducing wavelength. This is because optical loss due to the diffraction loss of the recording light and reproducing light by the particles 11 is suppressed. Furthermore, by making the particle-size of the particles 11 to be a quarter of the recording wavelength and the reproducing wavelength, since not only the diffraction loss but also the scattering loss can be suppressed, the optical loss of the recording light and the reproducing light can be reduced.

The particle-holding material 10 is made of a material that is substantially transparent to the recording light and the reproducing light. Furthermore, since the particle-holding material 10 is used for recording materials, it is formed of, for example, a material whose optical constant changes at predetermined temperature, for example, a material whose refractive index changes (e.g., occurrence of thermal deformation, etc.) at a predetermined temperature. For the particle-holding material 10, for example, PMMA, a photopolymer resin, an ultraviolet curable resin, polyester, or the like, can be used.

It is preferable that the recording layer 1 includes 1 wt. % to 95 wt. % of the particles 11. When the thickness of one recording layer is thin, e.g., about 1 µm, if about 1 wt. % of the particles 11 are present, the recording sensitivity can be improved and if about 95 wt. % of the particles 11 are present, the optical loss due to light scattering can be suppressed. Furthermore, as mentioned below, since the particle-holding material 10 functions as a recording material, it is preferable that 30 wt. % or more of the particle-holding materials 10 are present. Therefore, it is preferable that the particles 11 are contained in the range of 70 wt. % or less. Furthermore, in order to achieve a sufficient recording sensitivity, the particles 11 are contained in the range of 30 wt. % or more.

By setting the difference between the refractive index of the particles 11 and the refractive index of the particle-holding material 10 to be 0.5 or less, it is possible to suppress the scattering loss of incident light, thus improving the efficiency in using light.

The intermediate layer 2 is substantially transparent to the recording light and the reproducing light. For example, PMMA, a photopolymer resin, an ultraviolet curable resin, polyester, or the like, can be used. The intermediate layer 2 may be formed of the same material as that of the particle-holding material 10 of the recording layer 1.

The substrate 9 can be formed of, for example, polycarbonate, PMMA, a norbornene resin (for example, "ARTON" (JSR Corporation)), a cycloolefin resin (for example, "ZEONEX" (ZEON CORPORATION, JAPAN)), or the like. The protective layer 4 can be formed of a transparent material, and for example, polycarbonate, PMMA, a norbornene resin (for example, "ARTON" (JSR Corporation)), a cycloolefin resin (for example, "ZEONEX" (ZEON CORPORATION, JAPAN)), or the like, can be used.

Next, recording of information on the information recording medium according to this embodiment will be explained.

The particles 11 and the particle-holding material 10 are substantially transparent to the recording light and the reproducing light. Therefore, in the information recording medium having a multilayered recording layer in this embodiment, the recording light and the reproducing light can reach the layer (a recording layer 1a in FIG. 1) that is the most distant from the surface on which light is incident, without much attenuation, enabling information to be recorded and reproduced three-dimensionally.

When light with a relatively high peak power is focused on the recording layer 1 as the recording light, a nonlinear absorption phenomenon such as the two-photon absorption, or multiphoton absorption, is induced at a high rate in the focal point with high optical power density (photon density). Note here that the nonlinear absorption phenomenon herein denotes a phenomenon in which the absorption sensitivity of the recording layer 1 is not proportional to the energy of light. An example of the nonlinear absorption phenomenon includes: the case where if the absorption sensitivity has a threshold value (in particular, in this embodiment, the threshold value is relatively large (for example, the energy threshold value: 10 pJ/µm$^2$ or more)), the two-photon absorption in which the absorption sensitivity is proportional to almost the square of the energy of light, or the multiple photon absorption in which the absorption sensitivity is proportional to almost the n-th power (n is an integer of 3 or more) of the energy of light occurs; the case where the two-photon absorption or the multiple photon absorption triggers plasma, and the combination thereof, and the like. For example, in the case where the two-photon absorption occurs in the recording layer 1 in the focal point of the recording light, the recording layer 1 in the focal point absorbs two-photons at the same time, and it looks as if the recording layer were irradiated with the light with a half wavelength of the recording wavelength. In this case, if the particles 11 are formed of materials that absorb at least a part of the light with a half wavelength of the recording wavelength of the particles 11 (the predetermined wavelength is set to be half of the recording wavelength), the particles 11 absorb the recording light at the focal point of the recording light. Heat caused by the light absorption of the particles 11 raises the temperature of the recording layer and reaches the predetermined temperature, and the optical constant of the particle-holding material 10 changes so as to form information bit 5. Thus, it is thought that at the time of recording, the optical constant of the particles 11 does not change for themselves but they act as a catalyst for changing the optical constant of the particle-holding material 10 so as to form the information bit 5.

In order to induce the nonlinear absorption phenomenon in the focal point of the recording light, conventionally, it was necessary to use a laser light with an extremely high peak power or to repeat irradiation at one place multiple times in the case where the peak power is not so high.

However, according to the information recording medium of this embodiment, even if the peak power is about several tens to several hundreds mW, such a nonlinear absorption phenomenon can be induced. Furthermore, even if the pulse laser light does not have such a high peak power, one information bit 5 can be formed by one pulse. This is thought because light is absorbed by the particles 11, thereby the effect unique to the particles, that is, excellent quantum effect or thermal transforming efficiency, etc. occurs and as a result, various nonlinear absorption phenomena, for example, generation of plasma, further are induced. Thereby, high speed recording using pulse laser light with a relatively small peak power can be achieved.

It is preferable that the pulse width of the recording light is in the range from 100 femtoseconds to 10 nanoseconds, and more preferably, in the range from 1 picosecond to 100 picoseconds. In general, with the increase in the pulse width of the laser light, the threshold value of the peak power for recording one bit on the information recording medium tends to be reduced. This is thought because when the pulse width of the laser light is increased, the energy is increased by the increment thereof. By permitting the recording at a relatively low peak power, the structure of the semiconductor laser that is a light source can be simplified. This is because the semiconductor laser with not so high peak power is not likely to be broken in the end face in which light is emitted. Therefore, actually, in order to suppress the peak power threshold value to be about 3 kW or less, it is desirable that the pulse width is set to be 1 picosecond or more. On the other hand, in general, the energy threshold value necessary for recording of one bit is minimum with respect to the laser light with the pulse width of several picoseconds. When the pulse width is increased, the energy threshold value gradually tends to increase. Therefore, practically, in order to suppress the energy threshold value to about 5 nJ or less, recording with a pulse width of 100 picoseconds or less is desired. Note here that the energy threshold value is obtained as a value by multiplying the pulse width of the laser light by the peak power threshold value.

Hereinafter, the case where the particles 11 are formed of zinc oxide will be explained as an example.

FIG. 4 shows a spectral transmittance curve of an information recording medium, in which the recording portion 3 formed by laminating ten layers of 0.13 μm-thick recording layers 1 containing about 55 wt. % of particles 11 made of zinc oxide and about 45 wt. % of particle-holding material 10 made of polyester via intermediate layers 2, is disposed between the substrate 9 and the protective layer 4. Note here that the energy gap of the zinc oxide is 3.2 eV and the absorption spectrum wavelength is 388 nm. As shown in FIG. 4, this information recording medium has a transmittance of about 90% including Fresnel reflectance of the surface of protective layer 4 and the surface of the substrate 9 of about 10% at the wavelength of 400 nm or more. Therefore, the recording layer 1 hardly absorbs and is transparent. Furthermore, in this information recording medium, the transmittance is lowered rapidly at the wavelength of 400 nm or less, and the transmittance becomes 0%, i.e., opaque at the wavelength of 370 nm. Therefore, in this information recording medium, it is possible to determine the predetermined wavelength in the range of 400 nm or less in which the transmittance is lowered rapidly. It is preferable to determine the predetermined wavelength in which the absorption rate is about 5% or more per one layer of the recording layers, and it is more preferable to determine the predetermined wavelength around 370 nm in which the absorption rate is 100%. In this recording layer 1, in the case where the recording of information by two-photon absorption is assumed, the light having twice the wavelength of the predetermined wavelength is used as recording light and thus, it looks as if the focal point were irradiated with the light with the predetermined wavelength. For example, when the predetermined wavelength is determined at 370 nm, the recording wavelength is set at 740 nm. Furthermore, the reproduction wavelength is set to be more than 400 nm in which the reproduction wavelength is practically transparent in the recording layer. Since such recording light and reproducing light are hardly absorbed by particles, they are not attenuated even when passing through the recording layer. Note here that when recording by the multiphoton absorption such as n-photon absorption, etc. is assumed, the wavelength of the recording light is set n-times of the predetermined wavelength and the same is true in the other cases.

As the particles 11, inorganic materials or semiconductor materials can be used. The use of inorganic materials for the particles 11 enables the recording layer to be stable. Furthermore, the use of the semiconductor materials for the particles 11 enables the transmittance of the recording layer in a certain range of wavelengths to be lowered rapidly as shown in FIG. 4. This property is more suitable for recording using the non-linear absorption such as the two-photon absorption. Furthermore, in order to obtain high reproduction resolution, it is preferable that the reproducing light having the wavelength of 150 nm to 500 nm is used. By using semiconductor materials having an energy gap of 2.5 eV or more and 8.3 eV or less for the particles 11, since the predetermined wavelength can be set to be smaller than 500 nm, the reproducing wavelength can be set to be 500 nm or less. Thus, the reproduction performance can be improved, and higher density recording can be carried out. Examples of such semiconductor materials include zinc oxide (ZnO) having an energy gap of 3.2 eV (absorption spectrum wavelength of 388 nm); tin oxide ($SnO_2$) having an energy gap of 3.8 eV (absorption spectrum wavelength of 326 nm); zinc sulfide (ZnS) having an energy gap of 3.6 eV (absorption spectrum wavelength of 344 nm); titanium oxide ($TiO_2$) having an energy gap of 3.2 eV (absorption spectrum wavelength of 388 nm); tungsten oxide ($WO_3$) having an energy gap of 3.2 eV (absorption spectrum wavelength of 388 nm); strontium titanate ($SrTiO_3$) having an energy gap of 3.2 eV (absorption spectrum wavelength of 388 nm); silicon carbide (SiC) having an energy gap of 3.0 eV (absorption spectrum wavelength of 413 nm); indium oxide ($In_2O_3$) having an energy gap of 2.8 eV (absorption spectrum wavelength of 443 nm); cadmium sulfide (CdS) having an energy gap of 2.5 eV (absorption spectrum wavelength of 497 nm); and the like.

Next, a method for producing an information recording medium of this embodiment will be explained with reference to FIGS. 2A to 2D.

Figure 2A:
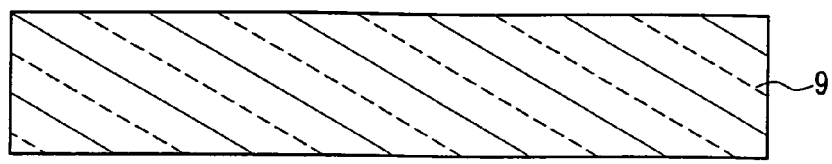
FIGS. 2A to 2D are cross-sectional views showing each step of producing an information recording medium according to Embodiment 1 of the present invention.
Figure 2B:
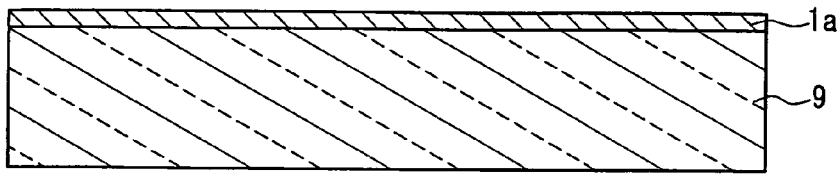
Figure 2C:
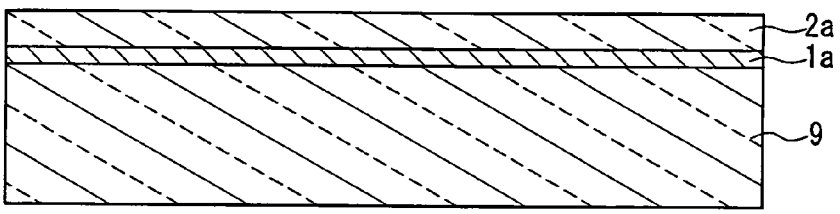
Figure 2D:
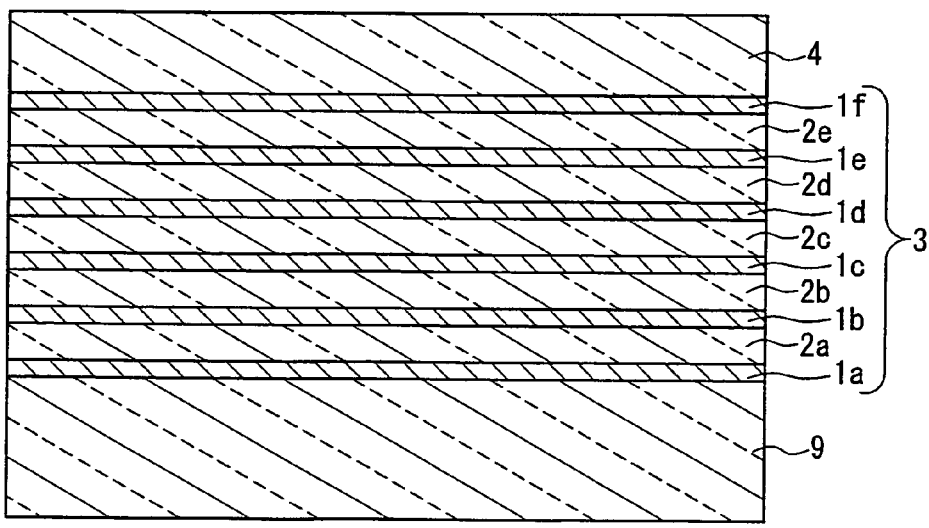

Firstly, a substrate 9 is prepared (see FIG. 2A). On the substrate 9, a recording layer 1a is formed by applying a coating containing the particles 11 and the particle-holding material 10 by, for example, spin coating, etc. (see FIG. 2B). Furthermore, an intermediate layer 2a is formed thereon by applying a coating containing materials for the intermediate layer by, for example, spin coating, etc. (see FIG. 2C). Furthermore, a recording layer 1b, an intermediate layer 2b, a recording layer 1c, . . . a recording layer if are formed thereon repeatedly, in the same manner. Finally, a protective layer 4 is formed by a method for applying a coating containing a material of the protective layer 4 or a film formation method (see FIG. 2D). Thus, by forming the recording layer 1 and the intermediate layer 2 by applying the materials, an information recording medium of this embodiment can be produced easily and at low cost.

Furthermore, by forming an excessive amount of the intermediate layer or the recording layer, the excessive portion (i.e., a part at the side where light is incident of the recording portion) may be formed as the protective layer 4. That is to say, on the recording layer 1f, a layer that is the same as the intermediate layers 2a to 2e further is formed so as to form the protective layer 4, or by forming the recording layer 1f thick, and a part of the recording layer 1f may be functioned as a part of the protective layer 4. Thus, it is not necessary to form the protective layer 4 by a different process from the process for producing the recording portion 3 and the protective layer 4 can be formed of materials substantially the same as those of the recording portion.

Next, an optical information recording/reproducing apparatus of this embodiment will be explained. As shown in FIG. 3, an optical head of the optical information recording/reproducing apparatus of this embodiment is provided with two kinds of light sources 20a and 20b. In an optical path from the light sources 20a and 20b to the information recording medium 22, beam splitters 18a and 18b, a collimator lens 16, a focus/track error signal detection element 15, a mirror 121, a spherical aberration correction element 13, and an objective lens 6 (lens pair 6a and 6b) are arranged. The light source 20a is a semiconductor laser light source having the wavelength of, for example, 405 nm and is used for reproducing information. The light source 20b is a semiconductor pulse laser light source having the wavelength of, for example, 740 nm and the pulse width of, for example, 100 femtoseconds to 10 nanoseconds and is used for recording information.

At the time of recording, a laser light 21b emitted from the light source 20b is bent toward the y direction by the beam splitter 18a; is made into substantially parallel light by the collimator lens 16; is transmitted through a diffraction focus/track-error signal detection element 15 (using 0-order diffraction light); and allows its optical path to bend toward the z direction by the mirror 121. Then, the laser light 8 bent in the z direction, passes through a spherical aberration correction element 13 and is focused on (as a convergent light 7) the recording portion 3 of the information recording medium 22 by the objective lens 6. Thus the information bit 5 is formed as shown in FIG. 1. The information bit 5 is formed by the use of the change in the optical constant of the recording layer 1. In this embodiment, the information bit 5 is formed by the use of the change in the refractive index or the change in the transmittance of the particle-holding material 10 of the recording layer 1, etc.

At the time of reproducing, a laser light 21a emitted from the light source 20a is transmitted through the beam splitters 18a and 18b; is made into substantially parallel light by the collimator lens 16; is transmitted through a diffraction focus/track-error signal detection element 15 (using the 0-order diffraction light); and allows its optical path to bend toward the z direction by the mirror 121. Then, the laser light 8 bent in the z direction passes through the spherical aberration correction element 13 and is focused (as a convergent light 7) on the recording portion 3 of the information recording medium 22 by the objective lens 6. The light reflected by the information bit 5 formed on the recording layer 1 is bent in the opposite direction; passes sequentially through the objective lens 6, the spherical aberration correction element 13, and the mirror 121; is divided into a plurality of lights by the diffraction focus/track-error signal detection element 15 (first-order diffractive light is used. In FIG. 3, for simplification, the divided light is not shown in the optical path from the diffraction focus/track-error signal detection element 15 to the beam splitter 18b) and is formed into the convergent light by the collimator lens 16; and further deflected in the -z direction by the beam splitter 18b. A plurality of divided light 17a to 17c deflected in the -z direction is transmitted through respective pin holes 14a to 14c of a pin hole array 14, and then signals are detected by optical detectors 19a to 19c.

Note here that in the optical information recording/reproducing apparatus of this embodiment, the recording light source and reproducing light source are provided separately. However, one light source is shared for the recording light source and the reproducing light source. In this case, the light source can be configured such that for example, the light source having, for example, the wavelength of 740 nm is used and in recording, the laser light having a large peak power is emitted via pulse oscillation, and in reproducing, laser light having the small peak power is emitted via successive oscillation. Thus, the number of light sources is one and the configuration of the apparatus can be simplified.

Furthermore, in this embodiment, a pin-hole array 14 composed of a plurality of pin-holes is placed substantially at the focal point of the entire divided light 17a to 17c. However, separate pin-holes may be placed corresponding to the respective focal points. The sizes of the pin-holes 14a to 14b are made to be smaller than the respective convergent light 17a to 17c, whereby light only in the central portion of the convergent light 17a to 17c can be detected and unnecessary high-order aberration light distributed around the periphery of the convergent light 17a to 17c can be removed. Thus, S/N of not only reproducing signals but also servo error signals can be improved. Note here that when the light amount is reduced by removing the peripheral light of the divided light 17a to 17c, it is preferable that the signal intensity is increased by using APD (avalanche photodiode) for a photodetector 19. Note here that in the case of the information recording medium in which a plurality of recording layers are provided, a large amount of detected light cannot be obtained because of the limitation of the material. Also for this reason, it is preferable to use APD.

Furthermore, instead of the pin-hole array 14, divided light 17a to 17c may be detected respectively by the photodetectors 19a to 19c whose areas are smaller than the respective divided light 17a to 17c. In this case, the same effect can be obtained.

Furthermore, only the divided light 17b and 17c corresponding to the track error signals are allowed to pass through the pin-holes 14b and 14c of the pin-hole array 14 and detected at the photodetector 19b and 19c, and the divided light 17a corresponding to the focus error signal is not allowed to pass through the pin-hole and detected directly by, for example, a four-dividing photodetector 19a. With such an arrangement, as the focus detection method, for example, an astigmatism method can be used. Furthermore, when the area of the photodetector 19a can be made to be smaller than the cross-sectional area of the divided light 17a at the detection point, the high-order aberration component can be reduced.

In this embodiment, by configuring the objective lens 6 as a lens pair, the numerical aperture (NA) is increased (for example, NA is 0.85). Note here that also in the case where the objective lens 6 is a single lens, the numerical aperture can be increased.

In this embodiment, the information bit 5 is recorded three-dimensionally on the recording portion 3 sequentially in the order in which the recording light does not pass through the information bit 5 that has already been recorded. By recording in such an order, it is possible to reduce stray light such as scattered light and unnecessary diffracted light from the information bit 5. Specifically, by forming the information bit 5 in the order from the recording layer located at the most distant from the objective lens 6 (recording layer 1a in FIG. 1) to the nearest recording layer, the recording in the above-mentioned order can be possible. In the information recording medium shown in FIG. 1, information is recorded three dimensionally in the -z direction in the order from the recording layer 1a, the recording layer 1b, the recording layer 1c .... At this time, since the thickness of the recording layer 1 through which the convergent light 7 passes is different depends upon the recording depth of the information bit 5, it is preferable that recording is carried out while controlling the amount of spherical aberration in accordance with the recording depth by the spherical aberration correction element 13 provided in the optical path from the light sources 20a and 20b to the objective lens 6. Thus, an excellent information bit 5 can be formed. For the spherical aberration correction element 13, a liquid crystal element capable of changing the refractive index distribution, a beam expander, in which a concave lens and a convex lens are combined and the interval between both lenses in the direction of an optical axis can be changed by an actuator, and the like can be used.

Note here that the recording order is not always limited to the -z direction as long as the convergent light 7 does not pass through the information bit 5 that has already been recorded if unrecorded portions of the information bit 5 are present.

Embodiment 2

Figure 5A:
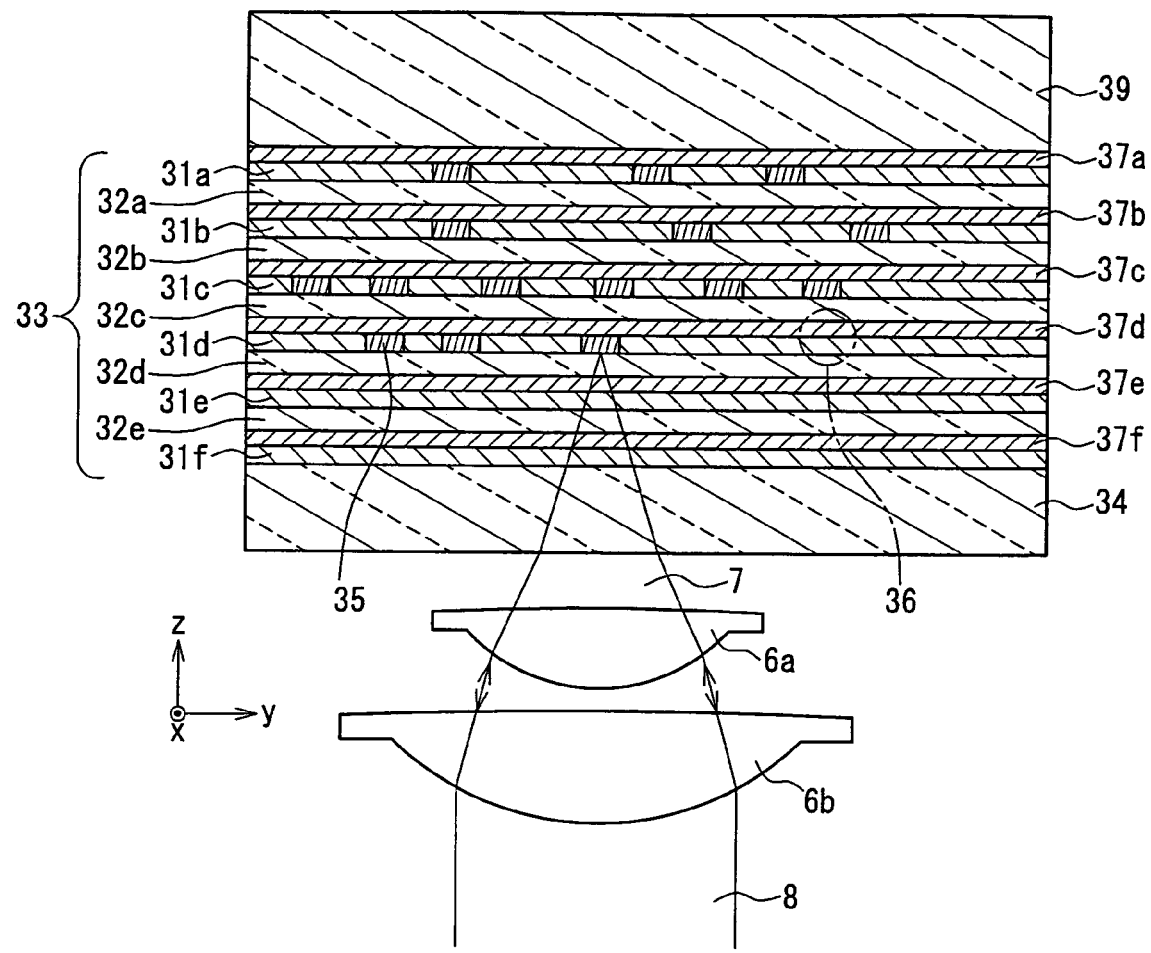
FIG. 5A is a view showing a cross-sectional configuration of an information recording medium and explaining a state in which information is recorded/reproduced according to Embodiment 2 of the present invention.
Figure 5B:
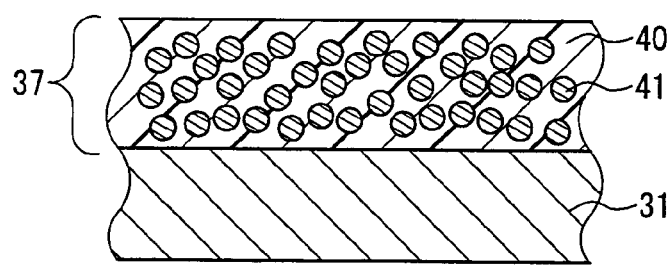
FIG. 5B is an enlarged view showing a recording layer and an auxiliary recording layer of the information recording medium shown in FIG. 5A.

An information recording medium and a method for producing the same according to Embodiment 2 of the present invention will be explained with reference to the drawings. FIGS. 5A and 5B show a cross-sectional configuration of the information recording medium and a state in which information is recorded and reproduced in the embodiment of the present invention.

As shown in FIG. 5A, in the information recording medium of this embodiment, on a substrate 39, a recording portion 33 and a protective layer 34 are formed. In the recording portion 33, a plurality of laminated bodies each composed of a recording layer and an auxiliary recording layer (a particle-containing layer) are laminated via intermediate layers. That is to say, in the recording portion 33, from the side of the substrate 39, an auxiliary recording layer 37a, a recording layer 31a, an intermediate layer 32a, an auxiliary recording layer 37b, a recording layer 31b, an intermediate layer 32b, ..., an intermediate layer 32e, an auxiliary recording layer 37f and a recording layer 31f are laminated sequentially. In the information recording medium of this embodiment, by including a plurality of recording layers in the recording portion 33, in addition to two-dimensional information recording, three-dimensional recording capable of recording by superimposing a plurality of layers in the thickness direction can be carried out. Note here that hereinafter, an arbitrary recording layer in the recording layers 31a to 31f will be referred to as a recording layer 31; an arbitrary intermediate layer in the intermediate layers 32a to 32e will be referred to as an intermediate layer 32; and an arbitrary auxiliary recording layer in the intermediate layers 37a to 37e will be referred to as an auxiliary recording layer 37.

FIG. 5B is an enlarged view showing the recording layer 31 and the auxiliary recording layer 37 (in the region 36 shown in FIG. 5A). As shown in FIG. 5B, the auxiliary recording layer 37 is provided in contact with the recording layer 31 and the auxiliary recording layer 37 is formed of the particle-holding material 40 in which particles 41 are dispersed. The particles 41 have the same properties and functions and can be formed of the same material as the particles 11 contained in the recording layer 1 of the information recording medium explained in Embodiment 1. Furthermore, also the particle-holding material 40 is required to be substantially transparent to the recording light and the reproducing light similar to the particle-holding material 10 contained in the recording layer included in the information recording medium in Embodiment 1. However, the optical constant of the particle-holding material 40 does not necessarily change at the predetermined temperature and it is rather preferable that the optical constant does not change. This is because in the information recording medium of this embodiment, the particle-holding material 40 does not function as a recording material but recording is carried out on the recording layer 31.

As the recording layer 31, a material whose refractive index or transmittance changes at the predetermined temperature is used, and a resin, tellurium glass, chalcogenide glass, and the like can be used. However, since a plurality of the recording layers are laminated to form a multi-layered structure, in order to reduce the loss of light, it is preferable that the recording layer is substantially transparent to the recording light and the reproducing light. The substrate 39, the protective layer 34 and the intermediate layer 32 have the same functions as those of the substrate 9, the protective layer 4 and the intermediate layer 2 respectively and can be formed of the same materials.

Next, recording information on the information recording medium of this embodiment will be explained.

In the information recording medium of this embodiment, like the recording layer 1 of the information recording medium of Embodiment 1, at the focal point of the recording light, a nonlinear absorption phenomenon such as the two-photon absorption is induced in the auxiliary recording layer 37 and the particles 41 absorb the recording light. The particles 41 absorb light and generate heat, and the heat is transferred to the recording layer 31 provided in contact with the auxiliary recording layer 37, thus increasing the temperature of the recording layer 31. When the temperature of the recording layer 31 reaches the predetermined temperature, the optical constant of the recording layer 31 changes and the information bit 35 is formed. According to this information recording medium, the recording sensitivity is improved versus that of the conventional information recording medium. This is thought because light is absorbed by the particles 41 contained in the auxiliary recording layer 37, the effect unique to the particles, that is, excellent quantum effect or thermal transforming efficiency, etc. occurs and as a result, various nonlinear absorption phenomena, for example, further are induced.

For the same reason in Embodiment 1, it is preferable that the recording light has a peak power of several tens to several hundreds mW or more and several kW or less, and the pulse width of in the range from 100 femtoseconds to 10 nanoseconds (more preferably, in the range from 1 picosecond to 100 picoseconds).

Also in the method for producing the information recording medium of this embodiment, it is preferable that respective layers are formed by coating the materials sequentially as in Embodiment 1. It is advantageous because the information recording medium can be produced easily and at low cost.

Furthermore, in the case where information is recorded and reproduced with respect to the information recording medium of this embodiment, the optical information recording/reproducing apparatus shown in FIG. 3 can be used.

Embodiment 3

Figure 6A:
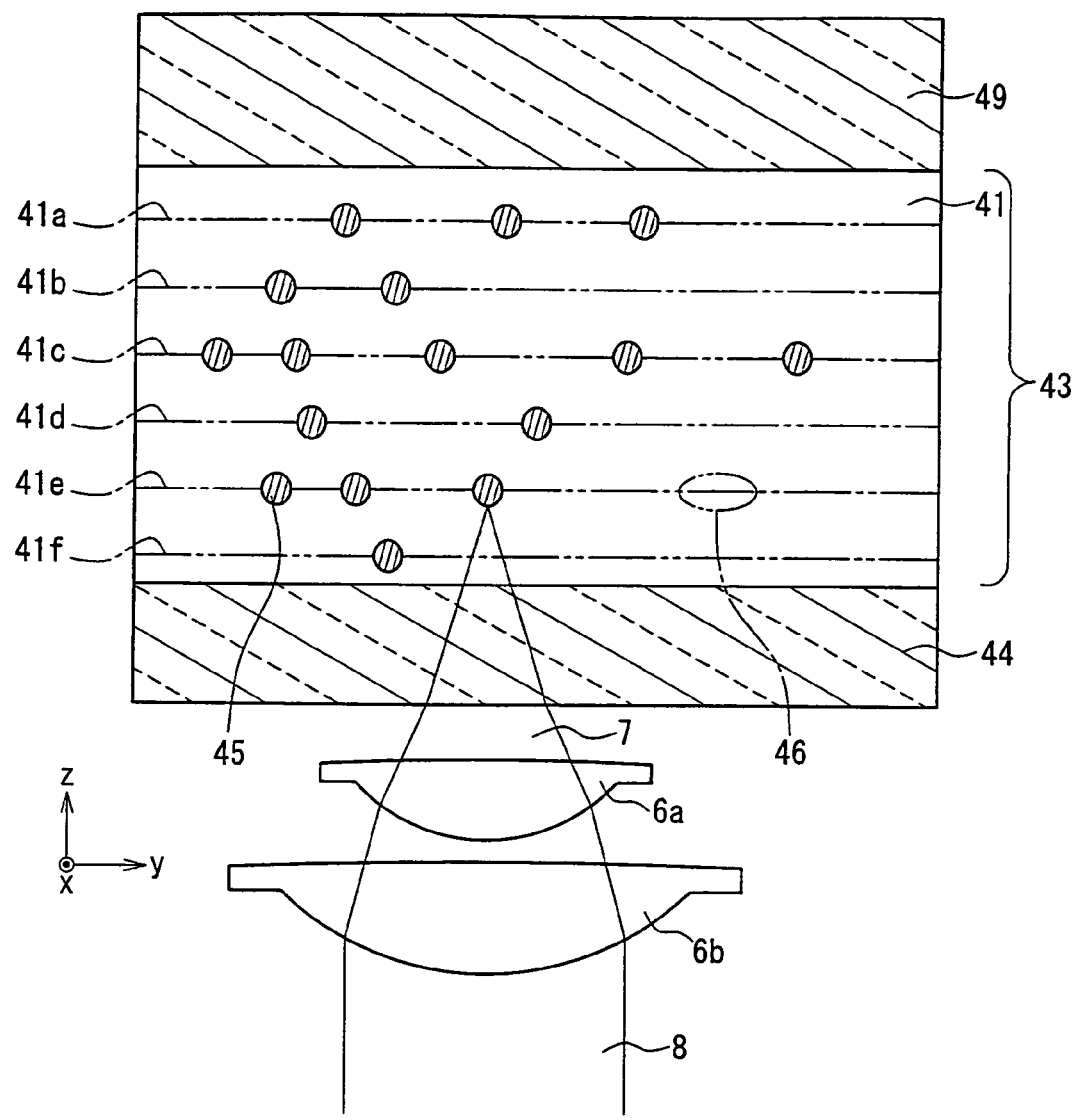
FIG. 6A is a view showing a cross-sectional configuration of an information recording medium and explaining a state in which information is recorded/reproduced according to Embodiment 3 of the present invention.
Figure 6B:
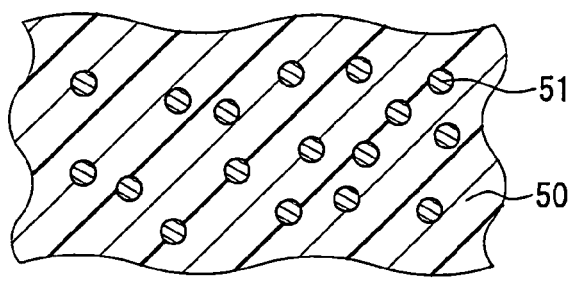
FIG. 6B is an enlarged view showing a recording layer of the information recording medium shown in FIG. 6A.

An information recording medium and a method for producing the same according to Embodiment 3 of the present invention will be explained with reference to drawings. FIGS. 6A and 6B show a cross-sectional configuration of the information recording medium and a state in which information is recorded/reproduced in the embodiment of the present invention.

As shown in FIG. 6A, in the information recording medium of this embodiment, on a substrate 49, a recording portion 43 and a protective layer 44 are formed. The information recording medium of this embodiment is different from the information recording media according to Embodiments 1 and 2 in that the whole recording portion 43 functions as a recording layer (particle-containing layer) 41. On substantially the same plane in the recording layer 41, rows of the information bits 45 are recorded. By providing a plurality of such recording surfaces (41a to 41f) in the recording layer 41, information can be recorded three-dimensionally.

FIG. 6B is an enlarged view showing the recording layer 41 (in the region 46 shown in FIG. 6A). As shown in FIG. 6B, the recording layer 41 is formed of the particle-holding material 50 in which particles 51 are dispersed. The particles 51 have the same properties and functions as those contained in the recording layer 1 of the information recording medium explained in Embodiment 1 and can be formed of the same materials as those in Embodiment 1. However, in the information recording medium of this embodiment, it is preferable that the content of the particles 51 is in the range from 0.3 wt. % to 10 wt. %. This is because it is possible to improve the recording sensitivity when the content is 0.3 wt. % or more, and it is possible to suppress the scattering loss so as to increase the light utilization efficiency when the content is 10 wt. % or less. The particle-holding material 50 has the same properties and functions as those of the particles-holding material 10 contained in the recording layer 1 of the information recording medium shown in Embodiment 1 and can be formed of the same materials as in Embodiment 1. In the case where the substrate 49 and the protective layer 44 are formed of the same material, the structure is simplified further and can be produced at low cost.

Recording of information on the information recording medium of this embodiment is the same as in Embodiment 1, therefore, for the same reason of Embodiment 1, it is preferable that the recording light has a peak power of several tens to several hundreds mW or more and several kW or less, and the pulse width of in the range from 100 femtoseconds to 10 nanoseconds (more preferably, in the range from 1 picosecond to 100 picoseconds).

The information recording medium in this embodiment can be produced by applying a coating containing the particles 51 and the particle-holding material 50 on the substrate 49, or by forming the recording layer 41 by injection molding. With such methods, the information recording medium can be formed easily at low cost.

Furthermore, in the case of reproducing information with respect to the information recording medium of this embodiment, it is possible to use an optical information recording/reproducing apparatus shown in FIG. 3.

In Embodiments 1 to 3 mentioned above, the embodiments of the present invention are explained. However, the present invention is not necessarily limited to these embodiments. It is possible to combine information recording media and the production methods thereof, and to combine the configurations of the optical information recording/reproducing apparatuses of the embodiments. Thus, the same effects can be obtained. Furthermore, the information recording medium and the optical information recording/reproducing apparatus of the present invention may include a rewritable type apparatus in addition to a write-one-type apparatus.

Furthermore, in Embodiments 1 and 2, the information recording medium including six layers of recording layers was explained. However, the number of laminating is not limited to six, and the number of the recording layers to be laminated layers is in the range of two or more and 100 layer or less.

Furthermore, in Embodiments 1 to 3, an optical disk was described as an example of the information recording medium, but the present invention is not limited to this alone, and the optical disk of the present invention may include a card type, drum type, and tape type media.

Note here that the objective lens and the collimator lens mentioned in the above-mentioned embodiment are mentioned for convention and they are the same as general lenses.

EXAMPLE

Next, one Example of the information recording medium of this embodiment will be explained. The information recording medium of this Example is an example of the information recording medium as shown in FIG. 1 explained in Embodiment 1.

On a polycarbonate substrate 9 (thickness: 1.1 mm) on the surface of which track grooves (groove for groove-recording having a pitch of 0.32 μm and the depth of 30 nm) were formed, a plurality of recording layers each having a thickness of 0.13 μm to 1 μm and intermediate layers each having a thickness of 3 μm were laminated alternately by spin coating so as to form a recording portion 3 (recording layers 1a to 1f and intermediate layers 2a to 2e), and further polycarbonate protective layer 4 (thickness: 100 μm) was formed. The recording layers 1a to 1f were formed of particles 11 including 55 wt. % of zinc oxide (average particle-size of 0.03 μm) and a particle-holding material 10 containing 45 wt. % of an ultraviolet curable resin. Furthermore, the intermediate layers 2a to 2e were formed of an ultraviolet curable resin.

The spectral transmittance curve of the information recording medium of this Example was substantially the same as that shown in FIG. 4. Then, the predetermined wavelength was set to 370 nm and the recording wavelength was set to 740 nm.

Figure 7:
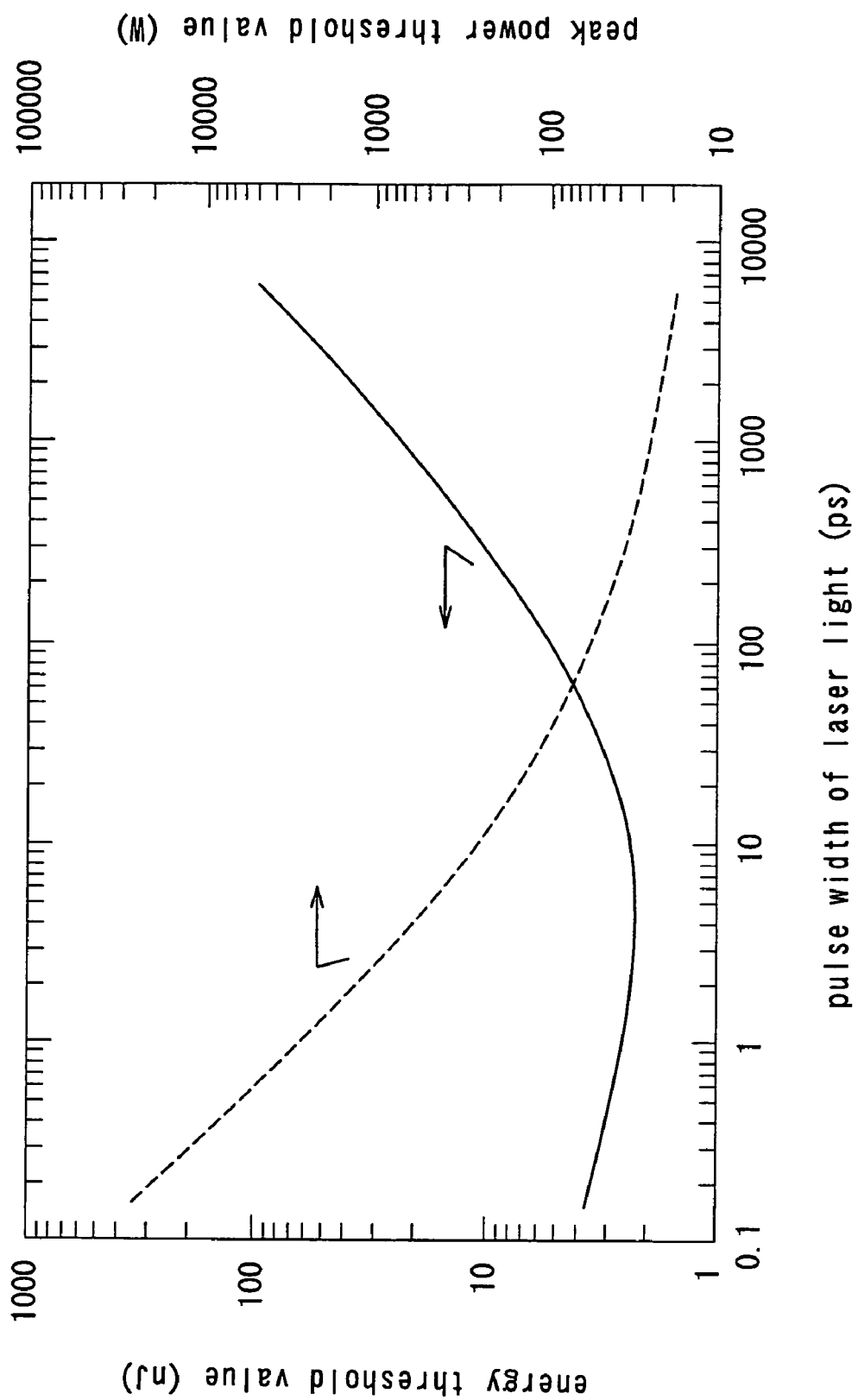
FIG. 7 is a graph showing the relationship between a pulse width of the recording laser light and both an energy threshold value and a peak power threshold value at the time of recording one information bit on the information recording medium of the Example of the present invention.
Figure 8:
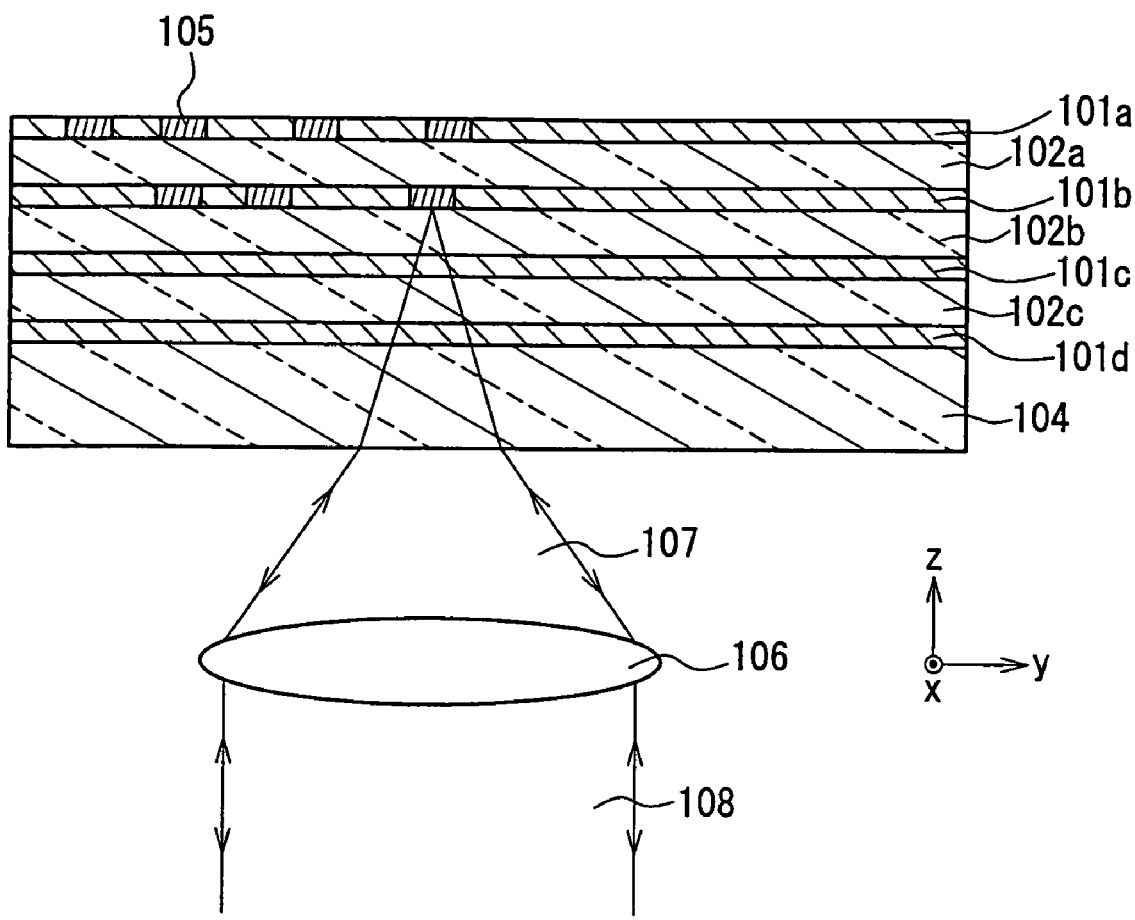
FIG. 8 is a view showing a cross-sectional configuration of a conventional information recording medium and explaining a state in which signals are recorded/reproduced.

FIG. 7 shows the measurement results of the energy threshold value and the peak power threshold value at the time of one bit recording with respect to the information recording medium when the pulse width was changed and irradiation with pulse light with the wavelength of 740 nm was carried out. With the increase in the pulse width of the pulse laser light, the threshold value of the peak power for recording one bit on the information recording medium tends to be lowered. By setting the pulse width to be one picosecond or more, the peak power threshold value could be suppressed to 3 kW or less. On the other hand, the energy threshold value required for one-bit recording was a minimum with respect to laser light with the pulse width of several picoseconds. With the increase in the pulse width, the energy threshold value tends to be increased gradually. By setting the pulse width to 100 picoseconds or less, the energy threshold value could be suppressed to 5 nJ or less.

From the results mentioned above, according to the information recording medium of this Example, by using the laser light with the peak power of 3 kW or less, it was confirmed that one information bit was formed by one pulse.

INDUSTRIAL APPLICABILITY

According to the information recording medium and a method for producing the same, and an optical information recording/reproducing apparatus of the present invention, the recording sensitivity is improved, and therefore one information bit can be formed by one pulse even if laser light having extremely high peak power is not used as conventionally. Therefore, it is possible to provide an information recording medium capable of recording with high sensitivity and at high speed, and an optical information recording/reproducing apparatus.

The invention claimed is:

1. An information recording medium comprising a recording portion capable of recording information three-dimensionally,
   wherein the recording portion comprises at least one particle-containing layer comprising:
      particles that absorb at least a part of light with a predetermined wavelength; are substantially transparent to recording light and reproducing light with wavelengths longer than the predetermined wavelength; and have an absorption rate with respect to the light with the predetermined wavelength being higher than the absorption rate with respect to the recording light and the reproducing light, and
      a particle-holding material that is substantially transparent to the recording light and the reproducing light.

2. The information recording medium according to claim 1, wherein the average particle-size of the particles is shorter than the wavelength of the recording light and the wavelength of the reproducing light.

3. The information recording medium according to claim 2, wherein the average particle-size of the particles is shorter than a quarter of the wavelength of the recording light and a quarter of the wavelength of the reproducing light.

4. The information recording medium according to claim 1, wherein the particle-containing layer is a recording layer, and the particle-holding material has an optical constant that changes at a predetermined temperature.

5. The information recording medium according to claim 4, wherein the recording portion comprises a plurality of the recording layers, and the plurality of recording layers are laminated via intermediate layers that are substantially transparent to the recording light and the reproducing light.

6. The information recording medium according to claim 1, wherein the recording portion further comprises a recording layer, and the particle-containing layer is an auxiliary recording layer disposed in contact with the recording layer.

7. The information recording medium according to claim 6, wherein a plurality of laminated bodies composed of the recording layer and the auxiliary recording layer are provided and between the laminated bodies that are adjacent to each other, an intermediate layer that is substantially transparent to the recording light and the reproducing light is provided.

8. The information recording medium according to claim 1, wherein the particle-containing layer is a recording layer; the particle-holding material has an optical constant that changes at a predetermined temperature; and the whole part of the recording portion is made of the one recording layer.

9. The information recording medium according to claim 1, wherein a protective layer that is substantially transparent to the recording light and the reproducing light is provided at the side of the recording portion on which light is incident.

10. The information recording medium according to claim 9, wherein the protective layer is made of the same material as that of the particle-holding material.

11. The information recording medium according to claim 5, wherein the intermediate layer is made of the same material as that of the particle-holding material.

12. The information recording medium according to claim 1, wherein the difference between the refractive index of the particle-holding material and the refractive index of the particles is 0.5 or less.

13. The information recording medium according to claim 1, wherein the particles comprise inorganic materials.

14. The information recording medium according to claim 1, wherein the particles comprise semiconductor materials.

15. The information recording medium according to claim 14, wherein the semiconductor material has an energy gap of 2.5 eV or more and 8.3 eV or less.

16. The information recording medium according to claim 15, wherein the particles comprise at least one selected from the group consisting of zinc oxide, tin oxide, zinc sulfide, titanium oxide, tungsten oxide, strontium titanate, silicon carbide, indium oxide, and cadmium sulfide.

17. The information recording medium according to claim 5, wherein the particle-containing layer comprises 1 wt. % or more and 95 wt. % or less of the particles.

18. The information recording medium according to claim 8, wherein the particle-containing layer comprises 0.3 wt. % or more and 10 wt. % or less of the particles.

19. The information recording medium according to claim 1, wherein the particle-holding material is a resin.

20. A method for producing the information recording medium described in claim 1, the method comprising:
    forming a coating containing the particles and the particle-holding material; and
    applying the coating so as to form the particle-containing layer.

21. The method for producing the information recording medium according to claim 20, further comprising: forming an intermediate layer by applying the coating containing materials substantially transparent to recording light and reproducing light,
    wherein in the step of forming the particle-containing layer, a material having an optical constant that changes at a predetermined temperature is used as the particle-holding material, and
    the step of forming the particle-containing layer and the step of forming the intermediate layer are repeated alternately predetermined number of times.

22. The method for producing the information recording medium according to claim 20, further comprising: forming an intermediate layer by applying a coating containing a material that is substantially transparent to the recording light and the reproducing light; and forming a recording layer by applying a coating containing a material having an optical constant that changes at a predetermined temperature;

wherein the step of forming the particle-containing layer, the step of forming the recording layer, and the step of forming the intermediate layer are repeated in a predetermined order and predetermined number of times periodically.

23. An optical information recording/reproducing apparatus for recording and reproducing information with respect to the information recording medium described in claim 1, the apparatus comprising:

a light source for emitting recording light;

a light source for emitting reproducing light;

an objective lens for focusing the light emitted from the light sources on the information recording medium; and a photodetector for detecting light reflected by the information recording medium;

wherein by using the change in the optical constant of a recording portion of the information recording medium, an information bit is recorded on the recording portion three-dimensionally.

24. The optical information recording/reproducing apparatus according to claim 23, wherein the light source for emitting recording light is a pulse laser light source, and a pulse width is in the range from 100 femtoseconds to 10 nanoseconds.

25. The optical information recording/reproducing apparatus according to claim 24, wherein the pulse width is in the range from 1 picosecond to 100 picoseconds.

26. The optical information recording/reproducing apparatus according to claim 23, wherein the wavelength of the light source for emitting reproducing light is shorter than the wavelength of the light source for emitting recording light.

27. The optical information recording/reproducing apparatus according to claim 23, wherein the information bit is recorded on the recording portion of the information recording medium by using a nonlinear absorption phenomenon.

28. The optical information recording/reproducing apparatus according to claim 27, wherein the nonlinear absorption phenomenon comprises the two-photon absorption or multiphoton absorption.

29. The optical information recording/reproducing apparatus according to claim 23, wherein the information bit is recorded three-dimensionally on the recording portion of the information recording medium in an order in which the recording light does not pass through information bits that already have been recorded on the recording portion.

30. The optical information recording/reproducing apparatus according to claim 29, wherein the information bit is recorded sequentially in the order from the position distant from the objective lens to the position near the objective lens in the recording portion of the information recording medium.

31. The optical information recording/reproducing apparatus according to claim 23, wherein one light source is shared for the light source for emitting the recording light and the light source for emitting the reproducing light.

32. The information recording medium according to claim 7, wherein the intermediate layer is made of the same material as that of the particle-holding material.

33. The information recording medium according to claim 7, wherein the particle-containing layer comprises 1 wt. % or more and 95 wt. % or less of the particles.

* * * * *